United States Patent
Ma et al.

(10) Patent No.: US 11,436,005 B2
(45) Date of Patent: Sep. 6, 2022

(54) GENERIC INTEGRATED DEVELOPMENT ENVIRONMENT EXTENSION TOOL FOR DESIGN SYSTEMS

(71) Applicant: salesforce.com, inc., San Francisco, CA (US)

(72) Inventors: Billy Ma, San Mateo, CA (US); James Matt Holland, San Francisco, CA (US)

(73) Assignee: Salesforce.com, Inc., San Francisco, CA (US)

( * ) Notice: Subject to any disclaimer, the term of this patent is extended or adjusted under 35 U.S.C. 154(b) by 0 days.

(21) Appl. No.: 16/399,799

(22) Filed: Apr. 30, 2019

(65) Prior Publication Data
US 2020/0348925 A1  Nov. 5, 2020

(51) Int. Cl.
G06F 8/70 (2018.01)
G06F 16/22 (2019.01)
G06F 16/23 (2019.01)

(52) U.S. Cl.
CPC .......... G06F 8/70 (2013.01); G06F 16/22 (2019.01); G06F 16/2365 (2019.01)

(58) Field of Classification Search
CPC ......... G06F 8/70; G06F 16/22; G06F 16/2365
USPC ........................................................ 717/121
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |

(Continued)

OTHER PUBLICATIONS

Lee et al, "Towards a Generic Infrastructure for Framework-Specific Integrated Development Environment Extensions". [Online], 2009, pp. 1-7, [Retrieved from internet on Apr. 21, 2022], <https://hal.archives-ouvertes.fr/hal-00350266/document> (Year: 2009).*

(Continued)

*Primary Examiner* — S. Sough
*Assistant Examiner* — Zengpu Wei
(74) *Attorney, Agent, or Firm* — Kwan & Olynick LLP

(57) ABSTRACT

In accordance with embodiments, there are provided mechanisms and methods for facilitating offering generic integrated development environments (IDE) extension in an on-demand services environment according to one embodiment. In one embodiment and by way of example, a method includes identifying a plurality of design systems and a plurality of components associated with the plurality of design systems, where at least one component of the plurality of components is identified for each of the plurality of design systems; integrating the plurality of components into a single structure of components. The method further includes generating a set of protocols based on the single structure of components, and associating the set of protocols to one or more IDEs such that set of protocols serves as a generic IDE extension to the one or more IDEs and is compatible with the plurality of design systems.

18 Claims, 7 Drawing Sheets

(56) References Cited

U.S. PATENT DOCUMENTS

| | | |
|---|---|---|
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 8,839,126 B1 | 9/2014 | Tang et al. |
| 9,009,669 B2 | 4/2015 | Pletter |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0236576 A1* | 12/2003 | Resnick ............ G05B 23/0213 |
| | | 700/9 |
| 2004/0001092 A1 | 1/2004 | Rothwein et al. |
| 2004/0003371 A1* | 1/2004 | Coulthard ................ G06F 8/24 |
| | | 717/101 |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0069753 A1 | 3/2006 | Hu et al. |
| 2009/0144640 A1* | 6/2009 | Schneider ............... H04L 67/36 |
| | | 715/760 |
| 2009/0177744 A1 | 7/2009 | Marlow et al. |
| 2011/0265066 A1 | 10/2011 | Fee et al. |
| 2013/0132929 A1* | 5/2013 | Weller ..................... G06F 8/70 |
| | | 717/113 |
| 2013/0339365 A1* | 12/2013 | Balasubramanian ........................ |
| | | G06F 16/951 |
| | | 707/741 |
| 2014/0278813 A1* | 9/2014 | Grosset ............. G06Q 10/0637 |
| | | 705/7.36 |
| 2015/0039682 A1 | 2/2015 | Chasman et al. |
| 2016/0170775 A1 | 6/2016 | Rockwell et al. |
| 2018/0337920 A1* | 11/2018 | Stites ...................... G06F 21/44 |
| 2019/0095197 A1* | 3/2019 | Ross ........................ G06F 8/36 |
| 2020/0042648 A1* | 2/2020 | Rao ......................... G06F 8/77 |
| 2020/0192638 A1* | 6/2020 | Pezaris .................... G06F 8/41 |

OTHER PUBLICATIONS

Yanagisawa, "Extension of Web-based Software Development Environment", [Online], 2015, pp. 463-466, [Retrieved from internet on Apr. 21, 2022], <https://ieeexplore.ieee.org/stamp/stamp.jsp?arnumber=7096219> (Year: 2015).*

Non-Final Office Action for U.S. Appl. No. 16/264,546 dated Feb. 20, 2020, 9 pages.

Notice of Allowance for U.S. Appl. No. 16/264,546 dated Aug. 14, 2020, 9 pages.

* cited by examiner

GENERIC INTEGRATED DEVELOPMENT ENVIRONMENT EXTENSION TOOL FOR DESIGN SYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management; more specifically, to facilitate generic integrated development environment (IDE) extension tool for design systems in an on-demand services environment.

BACKGROUND

Conventional techniques do not provide for any comment or generic tool to deal with multiple design systems without having the developers sending endless hours manually updating and cross-referencing between various design systems and their existing systems. Such techniques are cumbersome, inefficient, and error-prone.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

SUMMARY

Figure 1:
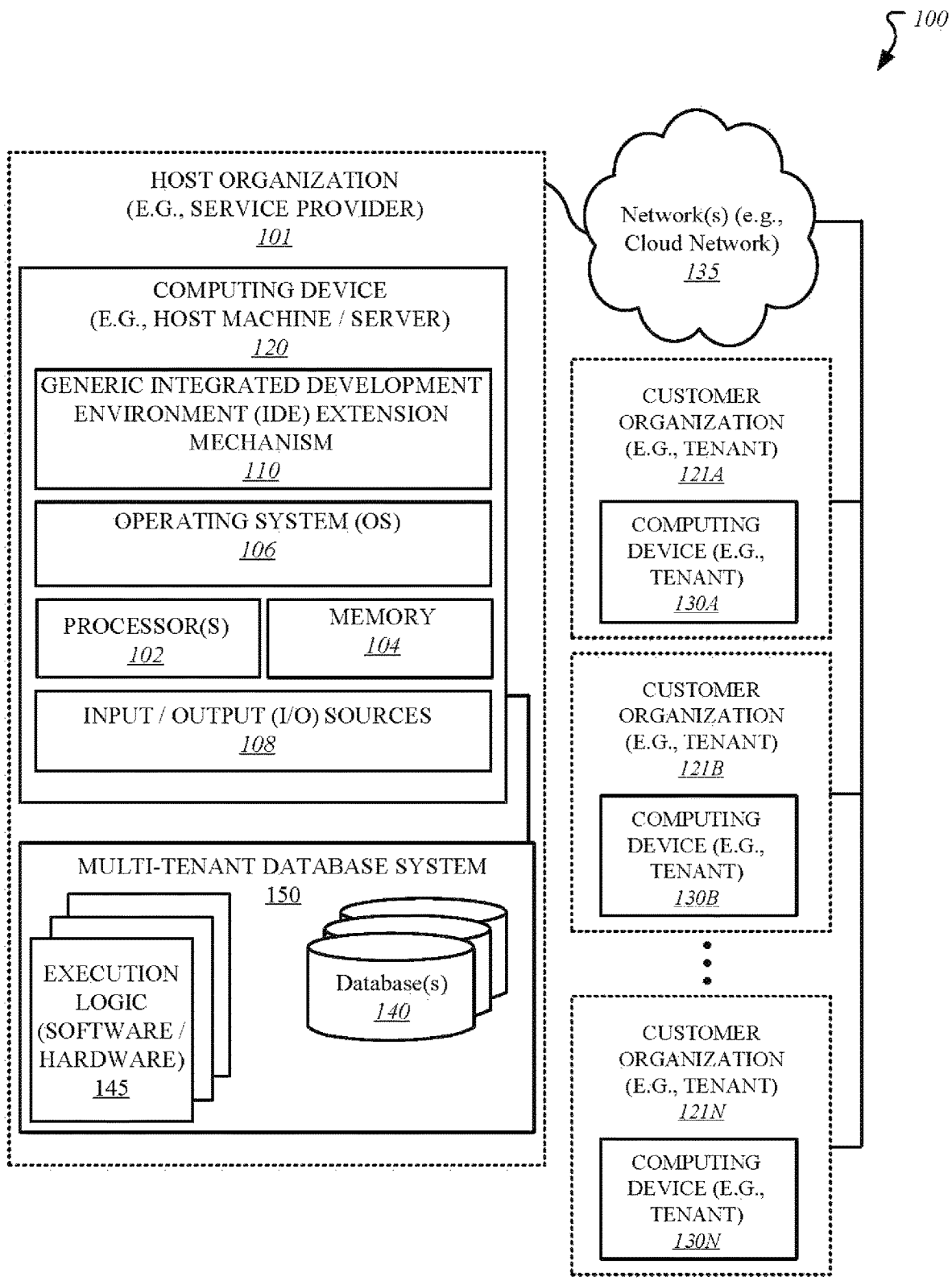
FIG. 1 illustrates a system having a computing device employing a generic IDE extension mechanism according to one embodiment.

In accordance with embodiments, there are provided mechanisms and methods for facilitating offering generic integrated development environments (IDE) extension in an on-demand services environment according to one embodiment. In one embodiment and by way of example, a method includes identifying a plurality of design systems and a plurality of components associated with the plurality of design systems, where at least one component of the plurality of components is identified for each of the plurality of design systems; integrating the plurality of components into a single structure of components. The method further includes generating a set of protocols based on the single structure of components, and associating the set of protocols to one or more IDEs such that set of protocols serves as a generic IDE extension to the one or more IDEs and is compatible with the plurality of design systems.

While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Embodiments provide for a novel technique for offering an IDE extension that is generic to and compatible with varying design systems for software development purposes. For example, this novel and innovative genetic IDE extension allows developers to work with multiple design systems, simultaneously, without having to update their own design systems or cross-referencing with other design systems or finding compatible IDEs.

Salesforce Lightning Design System (SLDS) refers to a styling application program interface (API) that is updated periodically. The corresponding values, functionality and/or signatures can change between versions/releases. The techniques described herein can be utilized to support these updates and increase efficiency. For example, the use of any of the techniques described herein with SLDS embodiments may result in reduction of burden on the developer to match tokens during development, can reduce the size of the Cascading Style Sheet (CSS) bundle, which can improve performance, and can provide support for user interface (UI) requirements (e.g., theming, densification). Within this structure SLDS tokens can be utilized to store/communicate design attributes for CSS (or other) files.

In one embodiment, this novel technique can serve to reduce design complexity. For example, each change within a bundle can be scanned against any design system for relevant information. For example, an existing implementation can scan one or more markup templates, JavaScript (JS), and/or style declaration(s). This component bundle can be translated into, for example, an abstract syntax tree (AST) or other structure. From there, a component tree can be constructed and analyzed, including static analysis, regular expression analysis, and/or structure hierarchy analysis. In one embodiment, recommendations and relevant flows can be generated before any constant integration (CI) and/or automation functionality is triggered.

In various embodiments described herein, static values within CSS files are tokenized. Thus, in SLDS embodiments, SLDS tokens are updated with new releases/updates, where any corresponding values (e.g., static values) in bundled CSS files can be consistently and automatically updated, which can function to streamline the update process. Similarly, utility classes in Hypertext Markup Language (HTML) and can be tokenized within the bundles In various embodiments, design tokens include visual design atoms of the design system. Specifically, tokens are named entities that store visual design attributes. Further, such tokens can be used in place of hard-coded values (e.g., hex values for color or pixel values for spacing) in order to maintain a scalable and consistent visual system for user interface (UI) development.

In various embodiments, tools described herein can function to analyze CSS, JS and/or HTML files to find one or more of: static values and incorrect token usage in the CSS files; invalid utility classes in the JS and/or HTML files; and/or provide recommendations to fix identified errors.

It is contemplated and to be noted that embodiments are not limited to certain types of queries or query languages, such as Salesforce Object Query Language (SOQL), Salesforce Object Search Language (SOSL), Sequential Query Language (SQL), etc. However, for the sake of brevity clarity, SQL may be used as an example throughout this document, but that embodiments are not limited as such.

It is contemplated that embodiments and their implementations are not merely limited to multi-tenant database system ("MTDBS") and can be used in other environments, such as a client-server system, a mobile device, a personal computer ("PC"), a web services environment, etc. However, for the sake of brevity and clarity, throughout this document, embodiments are described with respect to a multi-tenant database system, such as Salesforce.com®, which is to be regarded as an example of an on-demand services environment. Other on-demand services environments include Salesforce® Exact Target Marketing Cloud™.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

In one embodiment, a multi-tenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

A tenant includes a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

FIG. 1 illustrates a system 100 having a computing device 120 employing a generic integrated development environment extension mechanism ("generic IDE extension mechanism") 110 according to one embodiment. In one embodiment, bottleneck management mechanism 110 provides for a generic IDE extension that is workable and compatible with multiple incompatible design systems to prevent the developers from spending time and efforts in manually setting their design systems.

As illustrated, in one embodiment, computing device 120, being part of host organization 101 (e.g., service provider, such as Salesforce.com®), represents or includes a server computer acting as a host machine for generic IDE extension mechanism 110 for facilitating smart deployment of metadata packages in a multi-tiered, multi-tenant, on-demand services environment.

It is to be noted that terms like "queue message", "job", "query", "request" or simply "message" may be referenced interchangeably and similarly, terms like "job types", "message types", "query type", and "request type" may be referenced interchangeably throughout this document. It is to be further noted that messages may be associated with one or more message types, which may relate to or be associated with one or more customer organizations, such as customer organizations 121A-121N, where, as aforementioned, throughout this document, "customer organizations" may be referred to as "tenants", "customers", or simply "organizations". An organization, for example, may include or refer to (without limitation) a business (e.g., small business, big business, etc.), a company, a corporation, a non-profit entity, an institution (e.g., educational institution), an agency (e.g., government agency), etc.), etc., serving as a customer or client of host organization 101 (also referred to as "service provider" or simply "host"), such as Salesforce.com®, serving as a host of generic IDE extension mechanism 110.

Similarly, the term "user" may refer to a system user, such as (without limitation) a software/application developer, a system administrator, a database administrator, an information technology professional, a program manager, product manager, etc. The term "user" may further refer to an end-user, such as (without limitations) one or more of tenants or customer organizations 121A-N and/or their representatives (e.g., individuals or groups working on behalf of one or more of customer organizations 121A-N), such as a salesperson, a sales manager, a product manager, an accountant, a director, an owner, a president, a system administrator, a computer programmer, an information technology ("IT") representative, etc.

Computing device 120 may include (without limitations) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 130A-130N, etc. Computing device 120 further includes processor(s) 102, memory 104, input/output ("I/O") sources 108, such as touchscreens, touch panels, touch pads, virtual or regular keyboards, virtual or regular mice, etc.

In one embodiment, host organization 101 may employ a production environment that is communicably interfaced with client devices 130A-N through host organization 101. Client devices 130A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system -based navigation systems, cable setup boxes, etc. In some embodiments, client devices 130A-include artificially intelligent devices, such as autonomous machines including (without limitations) one or more of autonomous vehicles, drones, robots, smart household appliances, smart equipment, etc.

In one embodiment, the illustrated multi-tenant database system 150 includes database(s) 140 to store (without limitation) information, relational tables, datasets, and underlying database records having tenant and user data therein on behalf of customer organizations 121A-N (e.g., tenants of multi-tenant database system 150 or their affiliated users). In alternative embodiments, a client-server computing architecture may be utilized in place of multi-tenant database system 150, or alternatively, a computing grid, or a pool of work servers, or some combination of hosted computing architectures may be utilized to carry out the computational workload and processing that is expected of host organization 101.

The illustrated multi-tenant database system 150 is shown to include one or more of underlying hardware, software, and logic elements 145 that implement, for example, database functionality and a code execution environment within host organization 101. In accordance with one embodiment, multi-tenant database system 150 further implements databases 140 to service database queries and other data interactions with the databases 140. In one embodiment, hardware, software, and logic elements 145 of multi-tenant database system 130 and its other elements, such as a distributed file store, a query interface, etc., may be separate and distinct from customer organizations (121A-121N) which utilize the services provided by host organization 101 by communicably interfacing with host organization 101 via network(s) 135 (e.g., cloud network, the Internet, etc.). In such a way, host organization 101 may implement on-demand services, on-demand database services, cloud computing services, etc., to subscribing customer organizations 121A-121N.

In some embodiments, host organization 101 receives input and other requests from a plurality of customer organizations 121A-N over one or more networks 135; for example, incoming search queries, database queries, application programming interface ("API") requests, interactions with displayed graphical user interfaces and displays at client devices 130A-N, or other inputs may be received from customer organizations 121A-N to be processed against multi-tenant database system 150 as queries via a query interface and stored at a distributed file store, pursuant to which results are then returned to an originator or requestor, such as a user of client devices 130A-N at any of customer organizations 121A-N.

As aforementioned, in one embodiment, each customer organization 121A-N is an entity selected from a group consisting of a separate and distinct remote organization, an organizational group within host organization 101, a business partner of host organization 101, a customer organization 121A-N that subscribes to cloud computing services provided by host organization 101, etc.

In one embodiment, requests are received at, or submitted to, a web server within host organization 101. Host organization 101 may receive a variety of requests for processing by host organization 101 and its multi-tenant database system 150. For example, incoming requests received at the web server may specify which services from host organization 101 are to be provided, such as query requests, search request, status requests, database transactions, graphical user interface requests and interactions, processing requests to retrieve, update, or store data on behalf of one of customer organizations 121A-N, code execution requests, and so forth. Further, the web-server at host organization 101 may be responsible for receiving requests from various customer organizations 121A-N via network(s) 135 on behalf of the query interface and for providing a web-based interface or other graphical displays to one or more end-user client devices 130A-N or machines originating such data requests.

Further, host organization 101 may implement a request interface via the web server or as a stand-alone interface to receive requests packets or other requests from the client devices 130A-N. The request interface may further support the return of response packets or other replies and responses in an outgoing direction from host organization 101 to one or more client devices 130A-N.

It is to be noted that any references to software codes, data and/or metadata (e.g., Customer Relationship Model ("CRM") data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com®, Force.com Apex™ code, JavaScript™, jQuery™, Developerforce™, Visualforce™, Service Cloud Console Integration Toolkit™ ("Integration Toolkit" or "Toolkit"), Platform on a Service™ ("PaaS"), Chatter® Groups, Sprint Planner®, MS Project®, etc.), domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "code", "software code", "application", "software application", "program", "software program", "package", "software code", "code", and "software package" may be used interchangeably throughout this document. Moreover, terms like "job", "input", "request", and "message" may be used interchangeably throughout this document.

Figure 2:
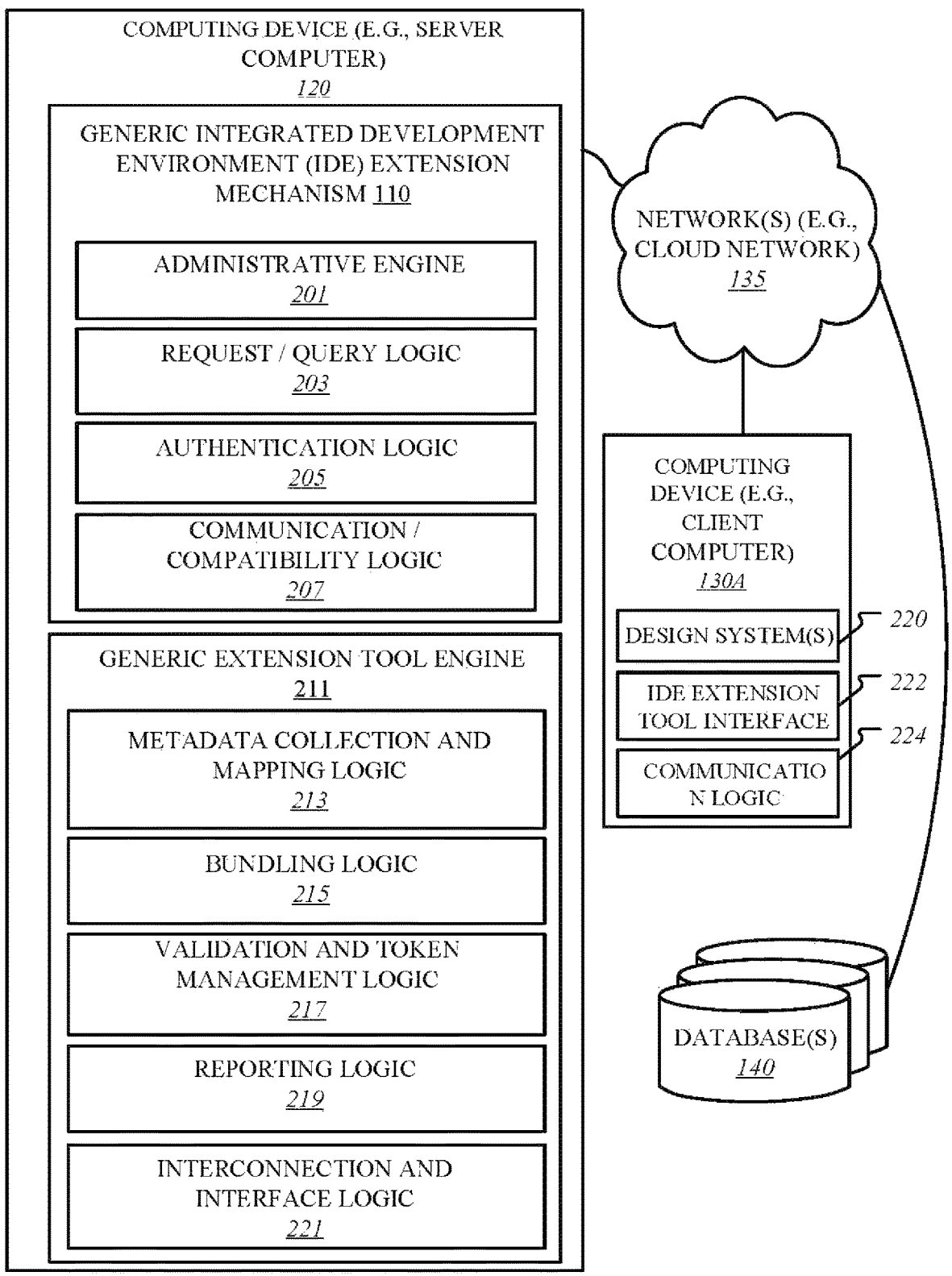
FIG. 2 illustrates a generic IDE extension mechanism according to one embodiment.

FIG. 2 illustrates generic IDE extension mechanism 110 of FIG. 1 according to one embodiment. In one embodiment, generic IDE extension mechanism 110 provides for a generic IDE extension for design systems, where generic IDE extension mechanism 110 includes any number and type of components, such as administration engine 201 having (without limitation): request/query logic 203; authentication logic 205; and communication/compatibility logic 207. Similarly, generic IDE extension mechanism 110 may further include generic extension tool engine ("tool engine") 211 including (without limitations): metadata collection and mapping logic ("metadata logic") 213; bundling logic 215; validation and token management engine ("validation/token engine") 217; reporting logic 219; and interconnection and interface logic 221.

In one embodiment, computing device 120 may serve as a service provider core (e.g., Salesforce.com® core) for hosting and maintaining generic IDE extension mechanism 110 and be in communication with one or more database(s) 140, client computer 130A, over one or more network(s) 135, and any number and type of dedicated nodes. In one embodiment, one or more database(s) 140 may be used to host, hold, or store data including interface details, API documentation, tool information, menus, objects, tables, code samples, HTTP client data, messages, queries, tenant and organization data, etc.

As will be further described in this document, server computing device serving as generic IDE extension computing device ("generic extension device") 120 is shown in communication with client computing device 130A over one or more network(s) 135 (e.g., cloud network, Internet, etc.). In one embodiment, client devices, such as client device 130A, may be provided a user interface as facilitated by interconnection and interface logic 221, where the user interface may serve as a layer above and associated with API(s) provided by a service provider (e.g., Salesforce.com®). As illustrated, client device 130A is shown as employing design system(s) 220, IDE extension interface 222, and communication logic 224.

Throughout this document, terms like "framework", "mechanism", "engine", "logic", "component", "module", "tool", "builder", "circuit", and "circuitry", may be referenced interchangeably and include, by way of example, software, hardware, firmware, or any combination thereof. Further, any use of a particular brand, word, or term, such as "query", "data", "integrated development environment", "generic", "IDE", "extension", "design system", "metadata", "metadata mapping", "database", "application", "detecting", "gathering", "bundling", "identifying", "integrating", "generating", "associating", "diagnosing", "classifying", "transmitting", "application programming interface", "API", "user interface", etc., should not be read to limit embodiments to software or devices that carry that label in products or in literature external to this document.

As aforementioned, with respect to FIG. 1, any number and type of requests and/or queries may be received at or submitted to request/query logic 203 for processing. For example, incoming requests may specify which services from computing device 120 are to be provided, such as query requests, search request, status requests, database transactions, graphical user interface requests and interactions, processing requests to retrieve, update, or store data, etc., on behalf of client device 130A, code execution requests, and so forth.

In one embodiment, computing device 120 may implement request/query logic 203 to serve as a request/query interface via a web server or as a stand-alone interface to receive requests packets or other requests from the client device 130A. The request interface may further support the return of response packets or other replies and responses in an outgoing direction from computing device 120 to one or more client device 130A.

Similarly, request/query logic 203 may serve as a query interface to provide additional functionalities to pass queries from, for example, a web service into the multi-tenant database system for execution against database(s) 140 and retrieval of customer data and stored records without the involvement of the multi-tenant database system or for processing search queries via the multi-tenant database system, as well as for the retrieval and processing of data maintained by other available data stores of the host organization's production environment. Further, authentication logic 205 may operate on behalf of the host organization, via computing device 120, to verify, authenticate, and authorize, user credentials associated with users attempting to gain access to the host organization via one or more client device 130A.

In one embodiment, computing device 120 may include a server computer which may be further in communication with one or more databases or storage repositories, such as database(s) 140, which may be located locally or remotely over one or more networks, such as network(s) 235 (e.g., cloud network, Internet, proximity network, intranet, Internet of Things ("IoT"), Cloud of Things ("CoT"), etc.). Computing device 120 is further shown to be in communication with any number and type of other computing devices, such as client device 130A, over one or more communication mediums, such as network(s) 140.

As previously described, there are not design systems-related extensions available today to lessen the complications associated with working with varying and incompatible design systems. Consequently, any developers working with such design systems spend endless hours updating cross-referencing design systems with their existing systems. For example, at times, a developer may need to simultaneously work with multiple design systems for their project, making their task that much difficult and complex.

Embodiments provide for a generic IDE extension that behaves like a compatible bridge between incompatible design systems, allowing developers to work, even simultaneously, with multiple design systems without having to perform any manual adjustments, cross-referencing, etc., leading to higher productivity and efficiency.

For example, there are various design systems available today for developers to use; however, each design system is based on its own protocols and preferences, which makes it not only trend differently from other design systems, but also develop incompatibility with such design systems. This leaves developers, such as UI developers, at a great disadvantage, such as when they may be required to work with as many as 20 different design systems, often simultaneously, to develop their product. This reduces productivity since these developers could be working with components that leverage varying design systems.

For example, SLDS and Trailhead Design Systems (TDS) are but only two of the design systems offered by Salesforce.com® for markup structure and styling guideline for lightning and markup structure and styling guideline for Salesforce Trailhead, respectively.

Embodiments offer this novel generic IDE extension, as facilitated by generic IDE extension mechanism 110, that possesses the necessary understanding of structure and syntax of different system systems as well as offers support for various design systems, while enhancing developer experience.

Structure and Syntax

With respect to syntax, it may include two parts: a) tokens (also referred to as variables); and b) classes. A cascading style sheet (CSS) variable, or one that of a similar pattern, translates an identifier to CSS values at runtime, as follows:

```
:root {
--paddingSmall: 2px;
}
.one {
padding: var(--paddingSmall);
}
```

While, for example, a CSS class used by developers for styling their component without CSS declaration may be as follows:

```
<div class="one"></div>
```

With respect to structure, design system token and classes may have restriction on where they may be used, such as:

```
:root {
--padding Small: 2px;
}
.one {
padding: var(--widthPaddingSmall);
}
```

For a design system to interact with this novel IDE extension, it may provide 3 sets of information: 1) tokens declaration, such as a CSS file with CSS variables, or a YAML Ain't Markup Language (YAML) file with a KEY/VALUE pair; 2) classes declaration, such as a CSS stylesheet with static value declaration, or token declaration; and 3) structure declaration, such as YAML, or JavaScript Object Notation (JSON), describing tokens and classes along with their restrictions.

Enhancing Developer Experience

Once the necessary information is gathered and registered, this novel tool may begin to offer IDE-like behavior to developers. For example, with respect to auto suggestion, when editing CSS, this novel IDE extension may take the pertinent design system structure into account and suggest tokens that are applicable to CSS declarations.

```
:root {
--widthPaddingSmall: 2px;
--verticalPaddingSmall: 2px;
--paddingSmall: 2px;
}
.one {
/* Only widthPaddingSmall &
paddingSmall show in AutoSuggestion */
padding-right: var(--
}
```

Similarly, with respect to quick fix, when editing components, this novel IDE extension may take various design system classes in consideration and suggest a quick fix for markup and style. Applying the quick fix may (1) add class ="one" to the markup, and (2) remove div block, such as:

Markup:

```
<div>One</div>
Style:
div {
padding-right: var(--widthPaddingSmall);
}
Design System Classes:
.one {
padding-right: var(--widthPaddingSmall);
}
```

Supporting Multiple Design Systems

As aforesaid, with conventional techniques, it is common for developers to simultaneously work with multiple design systems for any given project. To be useful in such scenarios, this novel IDE extension embeds intelligence to understand any relation between various active design systems being used in a workspace.

With respect to isolation, two or more design systems can work independently from each other, such as when two matching design tokens are available, this novel IDE extension can leverage either one without any issue or obstacle:

```
/** Design System One **/
:root {
--ds1PaddingSmall: 2px;
}
/** Design System Two **/
:root {
--ds2PaddingSmall: 2px;
}
```

In case of a hierarchical approach, two or more design systems may depend on each other in an orderly fashion, such as when examining the following design system classes, this novel IDE extension may leverage a design system that is assigned a higher order:

```
/** Design System One: Order 1 **/
.one {
    padding-right: var(--widthPaddingSmall);
}
/** Design System Two: Order 2 **/
.two {
    padding-right: var(--widthPaddingSmall);
}
```

With respect to complimentary systems, where two or more design systems work with each other without encountering any conflict, such as when this IDE extension provides classes quick fixes for the following CSS, it would leverage design system classes from all active design systems:

```
/** Design System One: Order 1 **/
.one {
    padding-right: var(--widthPaddingSmall);
}
/** Design System Two: Order 2 **/
.two {
    padding-left: var(--widthPaddingSmall);
}
```

In complimentary systems, when dealing with component bundling, as facilitated by bundling logic 215, style and markup are offered as follows:

Style:

```
div {
    padding-right: var(--widthPaddingSmall);
    padding-left: var(--widthPadding Small);
}
Markup:
<div>One</div>
<!-- After Quickfix Applied -->
<div class="one two">One</div>
```

SLDS Validator

Any developer would appreciate having a tool that would allow them to have a CSS declaration that could leverage a design token or a utility class. However, cross-referencing a design system for recommendations with corresponding files and locations associated with other design systems is not an easy task. This novel IDE extension gathers all the necessary information about design systems to allow for such cross-referencing between various design systems as facilitated by validation and token management engine 217.

For example, in one embodiment, this novel IDE extension is equipped with all the necessary information to: a) generate recommendations, in runtime and on-the-fly, as developers make changes to their components; b) highlights and/or underlines locations where a recommendation may apply; c) provides fixes based on selected recommendations; and d) supports IDEs without any overhaul.

In one embodiment, validation and token management engine 217 may build and use a language server using an SLDS validator. A language server refers to a community-driven knowledge of language server protocol (LSP) implementations. For example, as facilitated by interconnection and interface logic 221, the LSP is used as a tool to provide interconnection and communication between a server, such as computing device 120, and a client, such as client device 130A, to integrate certain features, like auto completing, going to definitions, finding references, etc. It is contemplated that embodiments are not limited to LSP and that LSP is merely used as an example and that embodiments can work with any other protocols that can offer the same or similar services.

In some embodiments, this novel IDE extension offers: 1) working with any number and types of editors, such as VSCode, Atom, Eclipse, Intellij, etc.; 2) provides recommendations, such as for open files; 3) offers updated recommendations as files are edited by users, where not saving is needed; 4) offers correction location information, such as line and column numbers that match the editors location, etc., as part of a recommendation, which further allows the IDE to indicate issues to the developer; 5) includes severity level with each recommendation, such as; a) error, where an item has no compelling reason to exist in code (e.g., static CSS value that as corresponding design token, invalid token in markup or javascript, etc.); b) warning, where an item uses an older token (e.g., BEM-naming, deprecated and/or replacement token, etc.); c) information, where an item is allowed, but not recommended (e.g., overriding CSS declaration for elements not defined in components); d) hint, where an item has alternative tokens (e.g., densify token, etc.); etc.; and 6) allows quick fixes for at least the following criteria: a) CSS (e.g., design token recommendation, deprecate token replacement recommendation, invalid design token recommendation, etc.); and b) markup and javascript (e.g., BEM-naming recommendation, invalid token recommendation, and densify token recommendation, etc.).

In some embodiment, the novel IDE extension further offers: 1) generating a quick fix for each item in a recommendation; 2) applying a quick fix to a component bundle that does not result in error; 3) if a quick fix involves multiple lines or files, applying all pertinent changes at the same time; 4) reporting issues within a server log; 5) quick fixing for utility class to update both CSS and relevant markup; 6) quick fixing for component blueprint updating all relevant files; 7) keeping quick fixing results and applications sensitive to the framework (e.g., applying separate design token quick fixes for react javascript and lightning components); etc. For example:

```
/**
Original CSS Declaration
*/
.THIS {
max-height: 200px;
}
/**
Lightning Component Design Token Quick Fix Result
*/
.THIS {
max-height: t(brandBandImageHeightMedium);
}
/**
React JS Component Desing Token Quick Fix Result
*/
.THIS {
max-height: var(--brandBandImageHeightMedium);
}
```

Referring to generic IDE extension mechanism 110, as illustrated, it includes tool engine 211 having metadata logic 213. In one embodiment, as will be further illustrated with reference to FIG. 3, metadata logic 213 may be used to collect metadata from various design system(s) 220 accessible to client device 130A. For example, using communication logic 224 at client device 224 each design system's metadata may be communicated over to metadata logic 213 which then holds this collected metadata, such as at database(s) 140, for further analysis and processing. In some embodiments, this metadata may be collected manually by investigating data system(s) 220 and inputting that metadata into computing device 120 for further processing.

Once the design system metadata data is obtained by metadata logic 213, it then parses the metadata for its ingredients, such as json files that contain information for design tokens (such as those used in CSS for static variables) and component information (used in markup). In one embodiment, metadata is what the novel tool of IDE extension will then use to diagnose and provide recommendations in accordance with rules of each of design system(s) 220.

Figure 3:
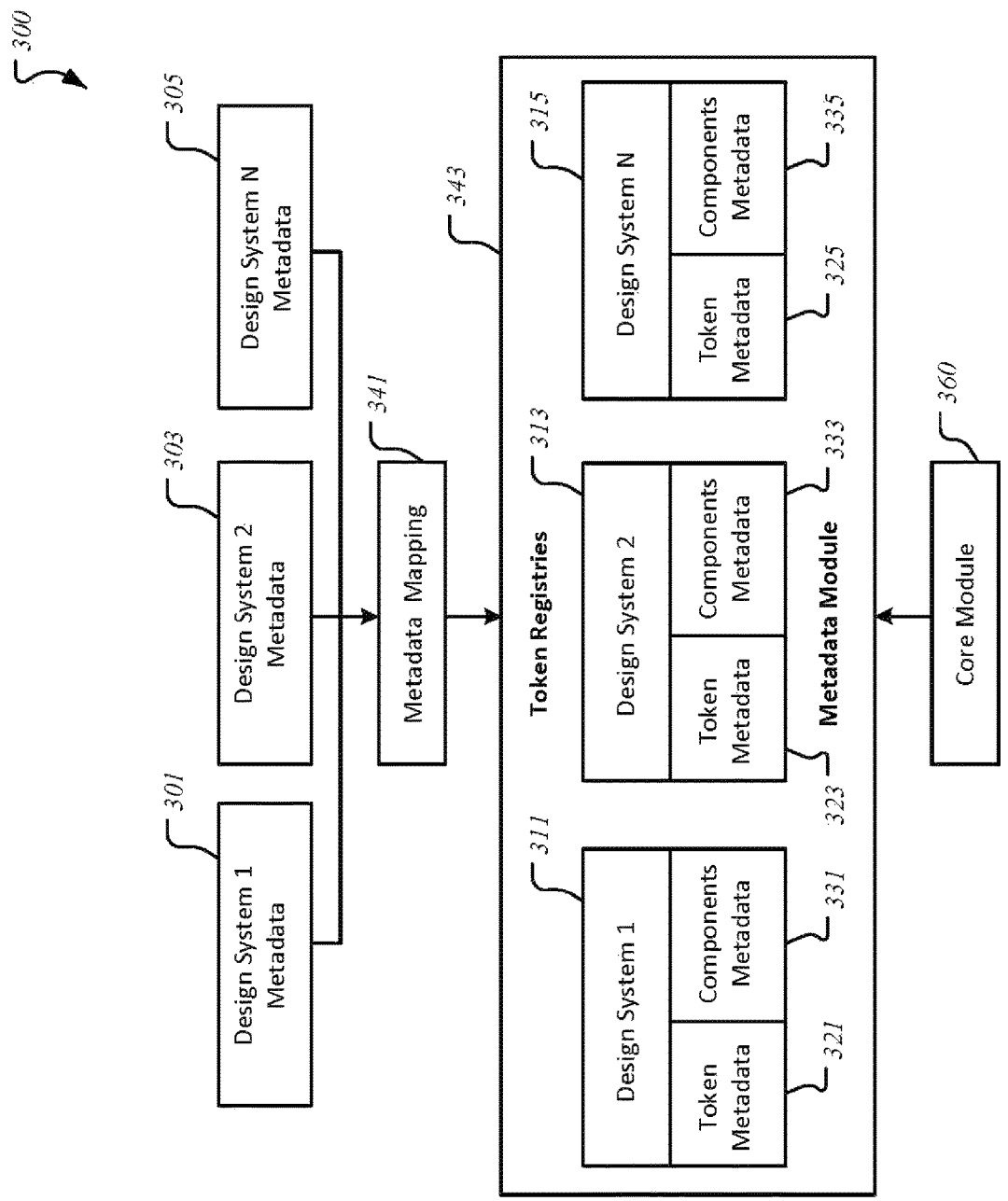
FIG. 3 illustrates a transaction sequence for design systems metadata ingestion according to one embodiment.

In one embodiment, metadata logic 213 is further to map this metadata to a json shape that is familiar to a metadata module that can consume and distribute this metadata to token registries of FIG. 3. These registries can hold and design system metadata and are where the recommendation tool in the core module pulls information for validation and recommendation. For example, metadata logic 213 provides metadata mapping such that the token registries include and hold token metadata and components metadata for each of design system(s) 220, all part of metadata module of FIG. 3. As further illustrated with respect to FIG. 3, core module consumes this metadata from the token registries on an as-needed basis for validating and making recommendations.

Figure 4:
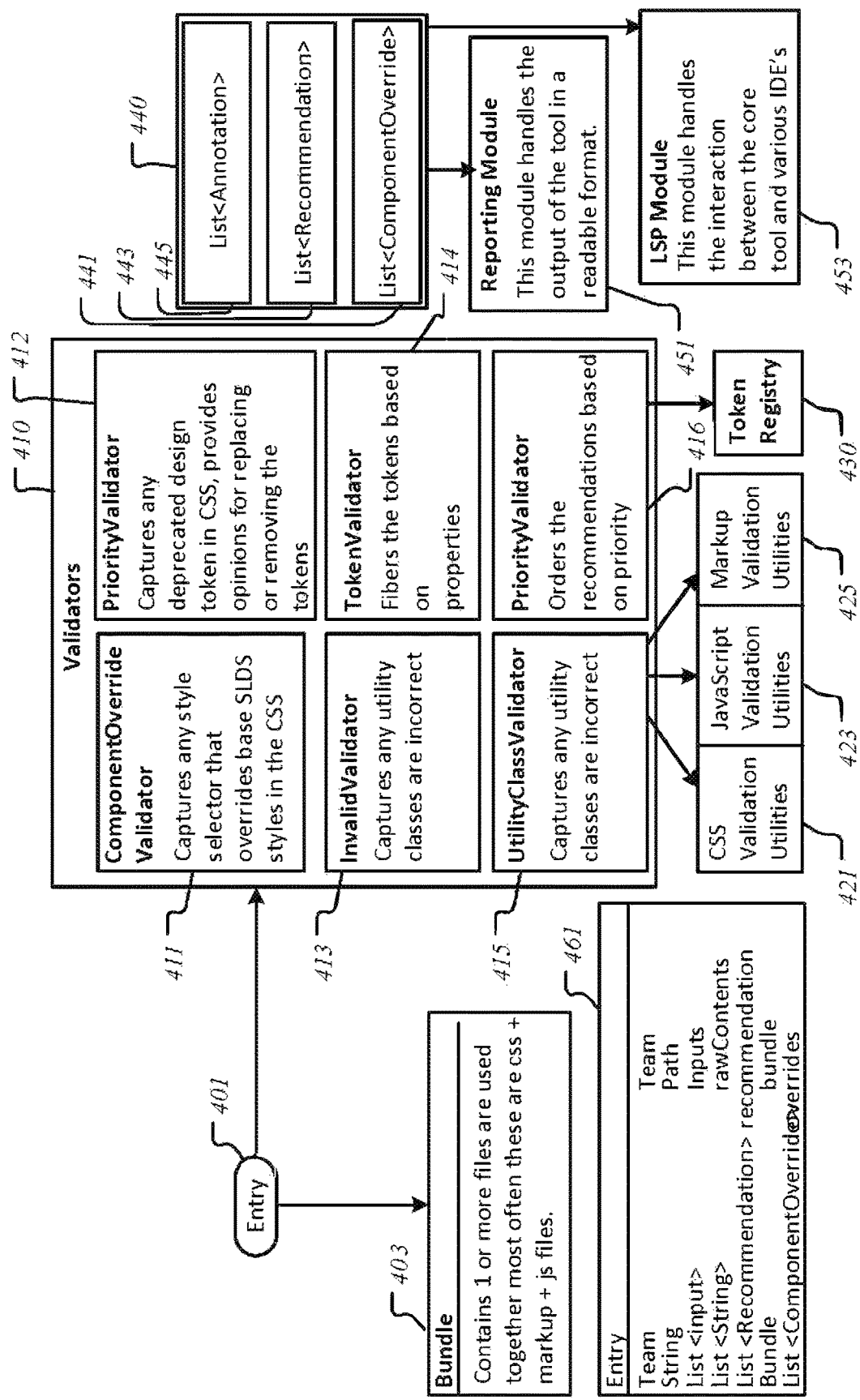
FIG. 4 illustrates a transaction sequence for offering a generic IDE extension tool according to one embodiment.

In one embodiment, as further illustrated with respect to FIG. 4, bundling logic 215 is then triggered where each entry being a file that is read in the core module is started for validation and recommendation process, where each entry is contained in a bundle. With this bundling intact, validation/token engine 217 is triggered to run the bundle through various validators that perform their respective validation checks to assess and analyze any necessary and pertinent recommendations per entry. Once the validators have run their validation checks, a list of recommendations, annotations, and component overrides is generated and outputted y validation/token engine 217. For example, annotations refer to locations in each entry where the user (e.g., developer) is told by the novel IDE extension tool to ignore certain lines. Component overrides refer to locations in each entry where the user overrides base styles of a design system base component. Recommendations are offered by the novel IDE extension tool for one or more class or style use. These results are then ingested into other modules of the IDE extension tool for various purposes.

This list of recommendations, annotations, and component overrides is then offered to reporting logic 219 to handle the output of the novel IDE extension tool based on this list in a readable format. In continuing with this flow, interconnection and interface logic 221 is then triggered to allow for interaction between the novel IDE extension tool and IDEs associated with and corresponding to design system(s) 220. In one embodiment, as aforesaid, this interaction may be performed based on or using LSPs.

On the client side, the developer can access and use the various design system(s) 220 with their corresponding IDEs using the single novel IDE extension tool offered through IDE extension interface 222.

As mentioned previously, it is contemplated that queries may include any number and type of requests seeking responses for processing jobs, running reports, seeking data, etc. These queries are typically placed by users on behalf of tenants, using client device 130A. It is contemplated that a tenant may include an organization of any size or type, such as a business, a company, a corporation, a government agency, a philanthropic or non-profit entity, an educational institution, etc., having single or multiple departments (e.g., accounting, marketing, legal, etc.), single or multiple layers of authority (e.g., C-level positions, directors, managers, receptionists, etc.), single or multiple types of businesses or sub-organizations (e.g., sodas, snacks, restaurants, sponsorships, charitable foundation, services, skills, time etc.) and/or the like Communication/compatibility logic 207 may facilitate the ability to dynamically communicate and stay configured with any number and type of software/application developing tools, models, data processing servers, database platforms and architectures, programming languages and their corresponding platforms, etc., while ensuring compatibility with changing technologies, parameters, protocols, standards, etc.

It is contemplated that any number and type of components may be added to and/or removed from generic IDE extension mechanism 110 to facilitate various embodiments including adding, removing, and/or enhancing certain features. It is contemplated that embodiments are not limited to any technology, topology, system, architecture, and/or standard and are dynamic enough to adopt and adapt to any future changes.

FIG. 3 illustrates a transaction sequence 300 according to one embodiment. Transaction sequence 300 may be performed by processing logic that may comprise hardware (e.g., circuitry, dedicated logic, programmable logic, etc.), software (such as instructions run on a processing device), or a combination thereof. In one embodiment, transaction sequence 300 may be performed or facilitated by one or more components of generic IDE extension mechanism 110 of FIG. 1. The processes of transaction sequence 300 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-2 may not be repeated or discussed hereafter.

As illustrated and further described with reference to FIG. 2, metadata relating to various design systems, such as design system(s) 220, are collected and distinguished by their corresponding design systems, such as design system 1 metadata 301, design system 2 metadata 303, and design system N metadata 305 corresponding to design system 1 311, design system 2 313, and design system N 315. As aforesaid, this metadata 1 301, 2 303, N 305 may contain json files that further contain information for design tokens (such as those used in CSS for static variables) and component information (such as used in markup) to make up for mapping 341 of token metadata 321, 323, and 325 and components metadata 331, 333, and 335 with their respective design systems 1 311, 2, 313, and N 315.

This mapping 341 of metadata 1 301, 2 303, and N 305 is further performed so that, for example, a json shape that is familiar to metadata module can consume and distribute metadata 1 301, 2 303, and N 305 to token registries 343. These token registries 343 hold design system metadata 1 301, 2 303, and N 305 as token metadata 321, 323, and 325 and components metadata 331, 333, and 335 such that the recommendation tool of core module 360 can pull the necessary and pertinent information for other purposes, such as validation and recommendation of FIG. 4. Further, as illustrated, core module 360 is allowed to access, use, and consume any of token metadata 321, 323, and 325 and components metadata 331, 333, and 335 associated with design systems 1 311, 2, 313, and N 315, respectively, in real-time, on-the-fly, and on as-needed basis for validating and making recommendations.

FIG. 4 illustrates a transaction sequence 400 according to one embodiment. Transaction sequence 400 may be performed by processing logic that may comprise hardware (e.g., circuitry, dedicated logic, programmable logic, etc.), software (such as instructions run on a processing device), or a combination thereof. In one embodiment, transaction sequence 400 may be performed or facilitated by one or more components of generic IDE extension mechanism 110 of FIG. 1. The processes of transaction sequence 400 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-3 may not be repeated or discussed hereafter.

Transaction sequence 400 begins with bundling 403 of entry 401, where entry 401 is a file that is read in the core module to start validation and recommendation processes, where each entry, such as entry 401, contains a bundle, such as bundle 403. At block 461, a list of what entry 401 may contain or be associated with is provided. At block 410, in one embodiment, entry 401 and all other such entries are run through multiple validators 411, 412, 413, 414, 415, 416 to perform their various corresponding validation checks to assess and evaluate any necessary and pertinent recommendations associated with entry 401.

In some embodiments, these validators 410 and their tasks include: 1) component override validator 411 to capture any style selector that overrides base SLDS styles in CSS; 2) design token validator 412 to capture any deprecated design token in CSS and provide options for replacing or removing tokens; 3) invalid validator 413 to capture any invalid design tokens in CSS; 4) token validator 414 to filter any tokens based on properties; 5) utility class validator 415 to capture any utility classes that are incorrect; and 6) priority validator 416 to order recommendations based on priority.

Further, in one embodiment, various validation utilities 421, 423, 425 are used to help with the validation process. These utilities 421, 423, 425 include CSS validation utilities 421, JavaScript validation utilities 423, and markup validation utilities 425 that may be specific to the type entries of CSS, JS, and Markup, respectively, and perform specific duties, such as finding locations, parsing data, finding values, respectively, and/or the like.

As further illustrated, token registry 430 may be used to hold the information relating to a design system, where validators 410 access this token registry 430 for information associated with design system tokens, components, and other rules for validating and providing recommendation. Further, in one embodiment, once these validators 410 have run their validation checks, a master list is prepared, such as list 440, including multiple lists including annotations 441, recommendations 443, and component overrides 445. As aforesaid, annotations refer to locations in entry 401 where the developer is instructed ignore certain lines of code. Component overrides refer to locations in entry 401 where the developer overrides base styles of a design system base component. Recommendations refer to a recommendation tool to provide for one or more class or style rule, where these results can now be ingested into other modules of the tool for various purposes.

Reporting modules 451, as facilitated by reporting logic 219 of FIG. 2, offers an output of the novel IDE extension tool that is in a readable format, while LSP module, as facilitated by interconnection and interface logic 221 of FIG. 2, facilitates interaction between the novel/core IDE extension tool and the various IDEs corresponding to the various design systems the developer may use.

Figure 5:
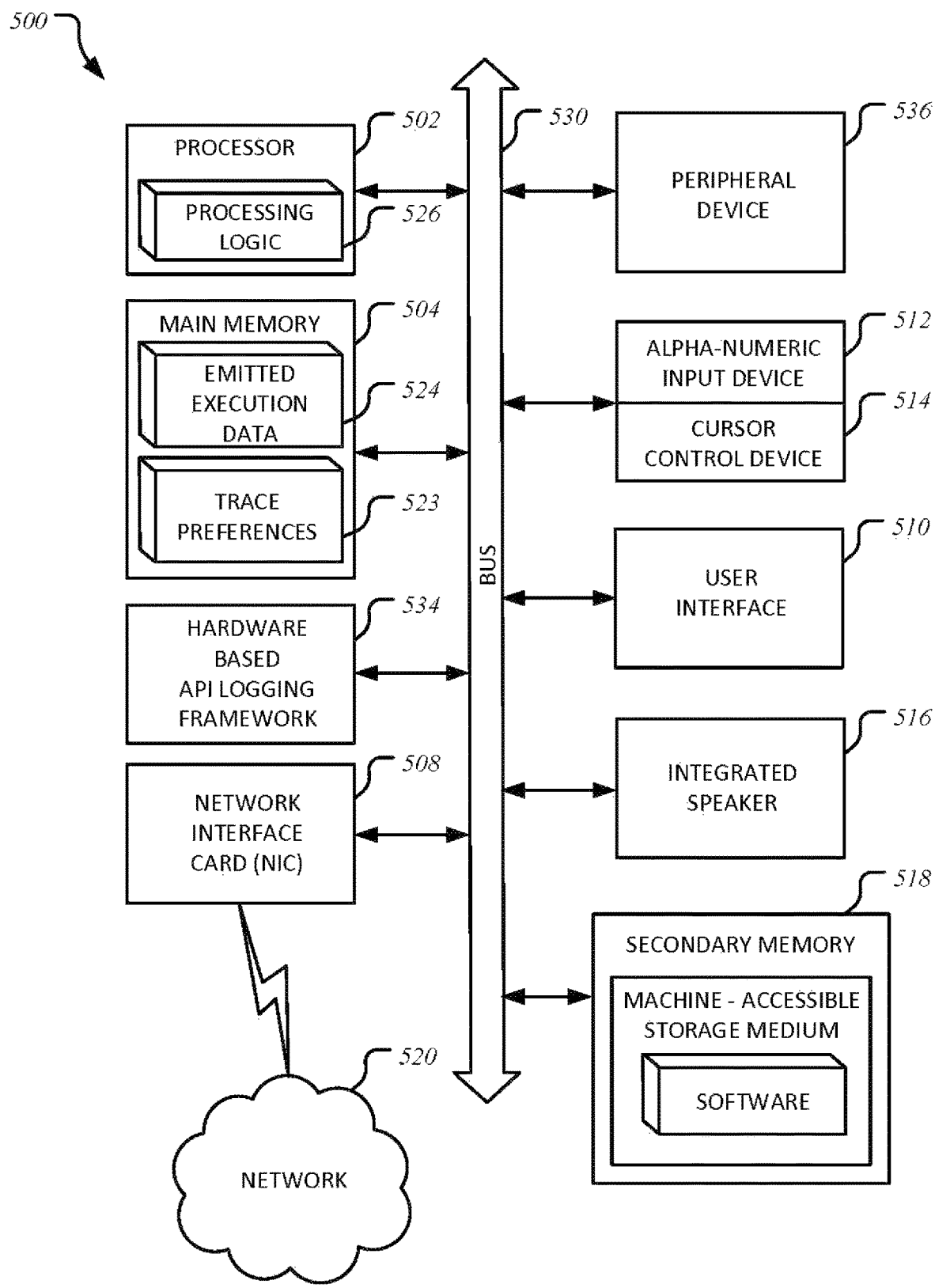
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing devices 120, 130A-N of FIG. 1. In alternative embodiments, the machine may be connected (e.g., networked) to other machines in a network (such as host machine 120 connected with client machines 130A-N over network(s) 135 of FIG. 1), such as a cloud-based network, Internet of Things (IoT) or Cloud of Things (CoT), a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of generic IDE extension mechanism 110 as described with reference to FIG. 1 and other Figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of generic IDE extension mechanism 110 as described with reference to FIG. 1, respectively, and other figures discussed herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer -readable media, such as non-transitory computer -readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
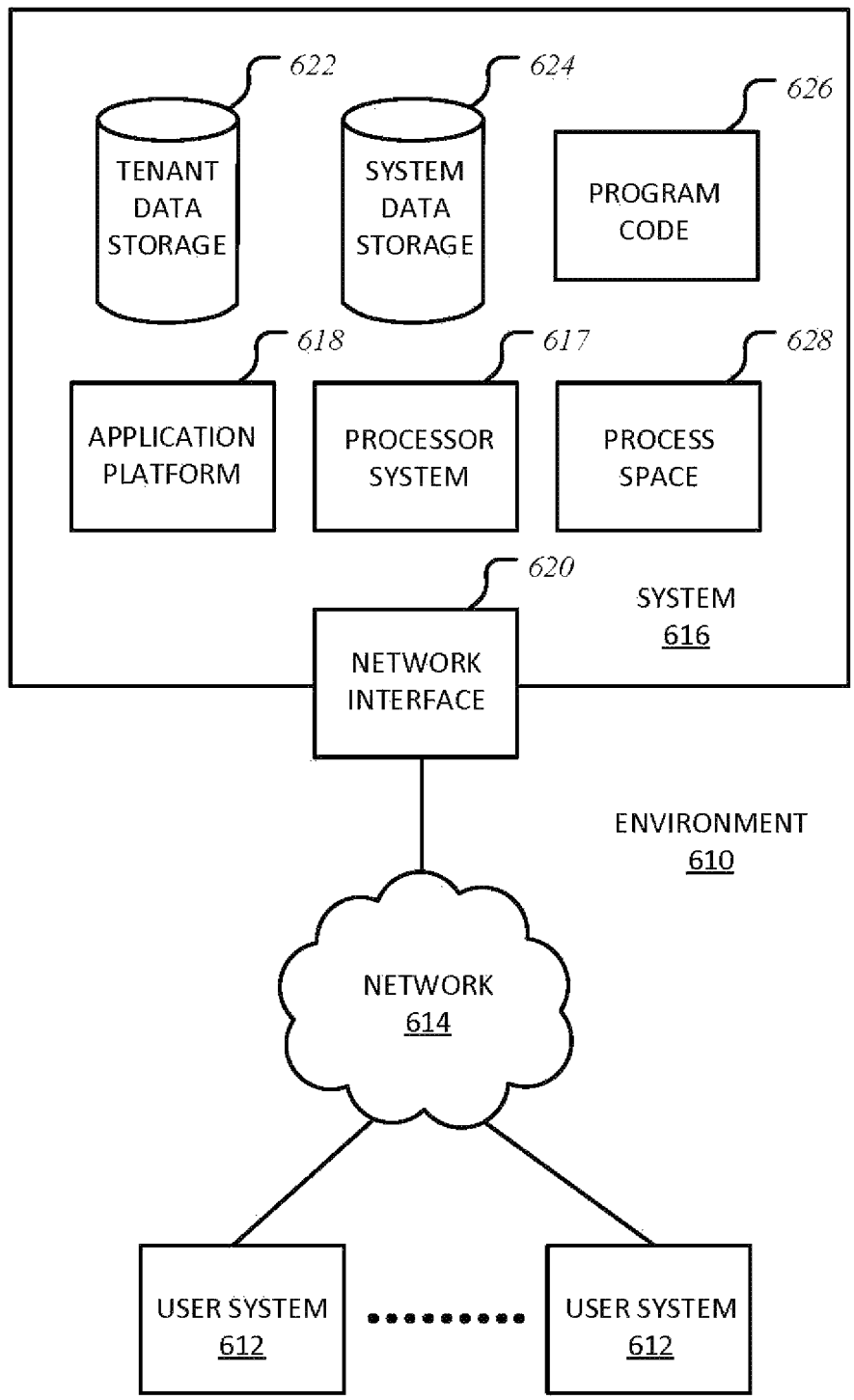
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a workstation, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third-party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load-sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third-party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database-indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
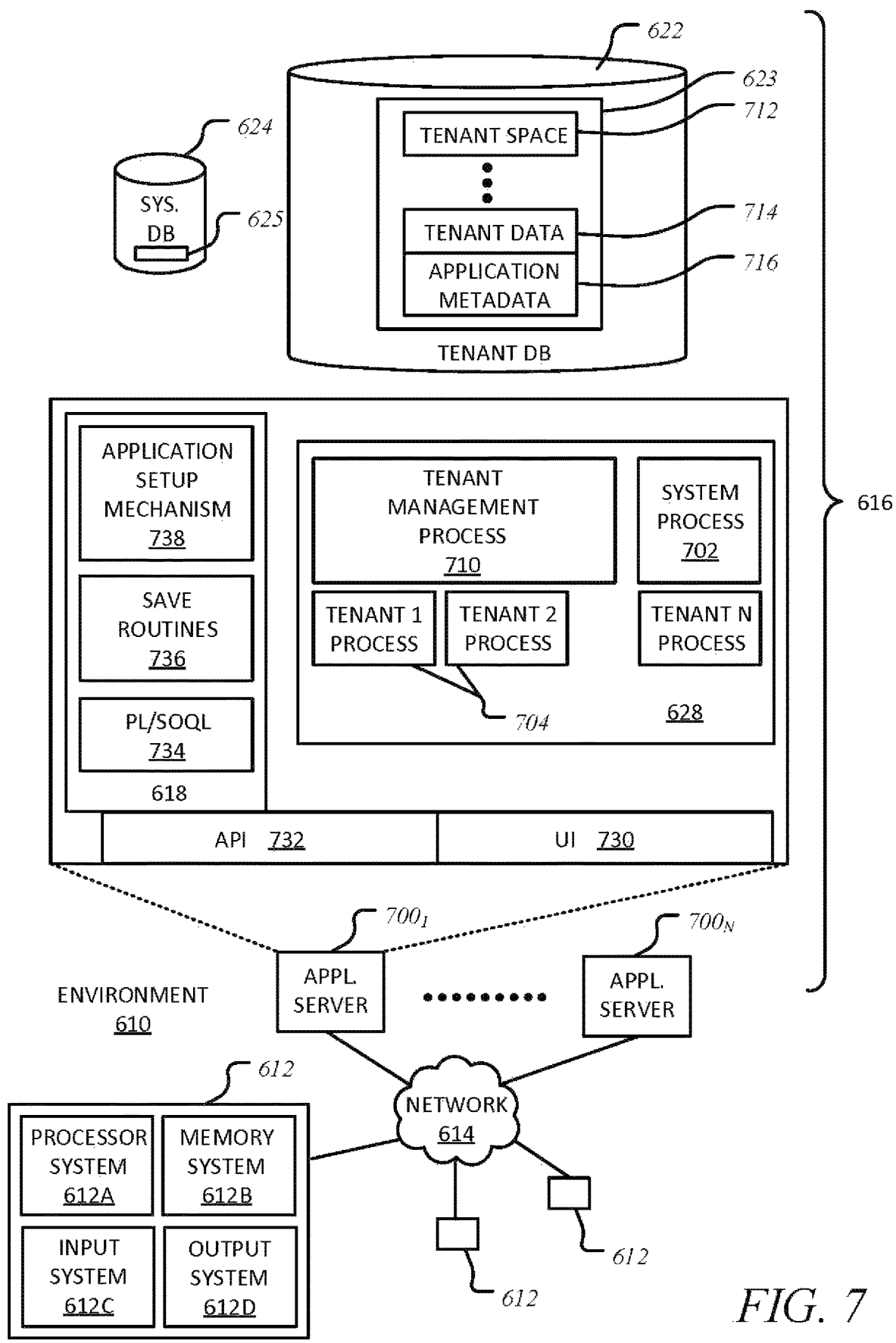
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers 700$_1$-700$_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks.

Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items may be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server 700$_1$ might be coupled via the network 614 (e.g., the Internet), another application server 700$_{N-1}$ might be coupled via a direct network link, and another application server 700$_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5

Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A computer-implemented method comprising:
   identifying design systems and component bundles associated with the design systems, wherein at least one component bundle is associated with at least one design system, wherein the component bundles include metadata sets revealing one or more of recommendations, annotations, or component overrides relating to the design systems;
   integrating the component bundles into a single structure of component bundles;

generating a set of protocols based on the single structure of component bundles; and associating the set of protocols to one or more integrated development environments (IDEs) to generate a generic IDE extension to the one or more IDEs, wherein the generic IDE extension is accessible to multiple types of the design systems, wherein the set of protocols that facilitate the generic IDE extension is configured to bridge the multiple types of the design systems based, at least in part, on token registries that store design system metadata associated with the design systems, wherein a core module retrieves information for validation and recommendation, and wherein the multiple types of design systems include one or more incompatible types of the design systems.

2. The method of claim 1, further comprising:

collecting the metadata sets associated with the design systems such that at least one of the metadata sets is associated with at least one of the design systems;

parsing the metadata sets into token metadata sets and components metadata sets; and mapping, at token registries, the token and components metadata sets to the design systems.

3. The method of claim 2, further comprising:

performing validation checks on the token and components metadata sets at the token scanning the token and components metadata sets for information to propose one or more of recommendations, annotations, and component overrides for the design systems.

4. The method of claim 3, wherein the validation checks comprise one or more of component override validation check, design token validation check, invalid validation check, token validation check, utility class validation check, and priority validation check, wherein the token and component metadata sets are scanned after running the validation checks.

5. The method of claim 3, wherein the recommendations refer to offering one or more recommendations associated with class rules or style rules for a design system, wherein the annotations refer to offering one or more locations within an entry for ignoring codes lines associated with the design system, and wherein the component overrides refer to offering a location in the entry where a base style of the design system is overridden.

6. The method of claim 1, wherein the generic IDE extension is offered as an IDE extension tool to a computing device via a user interface including one or more of a graphical user interface (GUI), a web browser, and an application-based interface, and an application programming interface (API).

7. A database system comprising:

a server computing device having a processing device and a storage device having instructions, the processing device to execute the instructions to facilitate a mechanism to perform operations comprising:

identifying design systems and component bundles associated with the design systems, wherein at least one component bundle is associated with at least one design system, wherein the component bundles include metadata sets revealing one or more of recommendations, annotations, or component overrides relating to the design systems;

integrating the component bundles into a single structure of component bundles;

generating a set of protocols based on the single structure of component bundles; and associating the set of protocols to one or more integrated development environments (IDEs) to generate a generic IDE extension to the one or more IDEs, wherein the generic IDE extension is accessible to multiple types of the design systems, wherein the set of protocols that facilitate the generic IDE extension is configured to bridge the multiple types of the design systems based, at least in part, on token registries that store design system metadata associated with the design systems, wherein a core module retrieves information for validation and recommendation, and wherein the multiple types of design systems include one or more incompatible types of the design systems.

8. The database system of claim 7, wherein the operations further comprise:

collecting the metadata sets associated with the design systems such that at least one of the metadata sets is associated with at least one of the design systems;

parsing the metadata sets into token metadata sets and components metadata sets; and mapping, at token registries, the token and components metadata sets to the design systems.

9. The database system of claim 8, wherein the operations further comprise:

performing validation checks on the token and components metadata sets at the token registries; and scanning the token and components metadata sets for information to propose one or more of recommendations, annotations, and component overrides for the design systems.

10. The database system of claim 9, wherein the validation checks comprise one or more of component override validation check, design token validation check, invalid validation check, token validation check, utility class validation check, and priority validation check, wherein the token and component metadata sets are scanned after running the validation checks.

11. The database system of claim 9, wherein the recommendations refer to offering one or more recommendations associated with class rules or style rules for a design system, wherein the annotations refer to offering one or more locations within an entry for ignoring codes lines associated with the design system, and wherein the component overrides refer to offering a location in the entry where a base style of the design system is overridden.

12. The database system of claim 7, wherein the generic IDE extension is offered as an IDE extension tool to a computing device via a user interface including one or more of a graphical user interface (GUI), a web browser, and an application-based interface, and an application programming interface (API).

13. A non-transitory computer-readable medium having stored thereon instructions which, when executed, cause a computing device to perform operations comprising:

identifying design systems and component bundles associated with the design systems, wherein at least one component bundle is associated with at least one design system, wherein the component bundles include metadata sets revealing one or more of recommendations, annotations, or component overrides relating to the design systems;

integrating the component bundles into a single structure of component bundles;

generating a set of protocols based on the single structure of component bundles; and associating the set of protocols to one or more integrated development environments (IDEs) to generate a generic IDE extension to the one or more IDEs, wherein the generic IDE extension is accessible to multiple types of the design systems, wherein the set of protocols that facilitate the generic IDE extension is configured to bridge the multiple types of the design systems based, at least in part, on token registries that store design system metadata associated with the design systems, wherein a core module retrieves information for validation and recommendation, and wherein the multiple types of design systems include one or more incompatible types of the design systems.

14. The non-transitory computer-readable medium of claim 13, wherein the operations further comprise:
   collecting the metadata sets associated with the design systems such that at least one of the metadata sets is associated with at least one of the design systems;
   parsing the metadata sets into token metadata sets and components metadata sets; and
   mapping, at token registries, the token and components metadata sets to the design systems.

15. The non-transitory computer-readable medium of claim 13, wherein the operations further comprise:
   performing validation checks on the token and components metadata sets at the token registries; and
   scanning the token and components metadata sets for information to propose one or more of recommendations, annotations, and component overrides for the design systems.

16. The non-transitory computer-readable medium of claim 14, wherein the validation checks comprise one or more of component override validation check, design token validation check, invalid validation check, token validation check, utility class validation check, and priority validation check, wherein the token and component metadata sets are scanned after running the validation checks.

17. The non-transitory computer-readable medium of claim 14, wherein the recommendations refer to offering one or more recommendations associated with class rules or style rules for a design system, wherein the annotations refer to offering one or more locations within an entry for ignoring codes lines associated with the design system, and wherein the component overrides refer to offering a location in the entry where a base style of the design system is overridden.

18. The non-transitory computer-readable medium of claim 13, wherein the generic IDE extension is offered as an IDE extension tool to a computing device via a user interface including one or more of a graphical user interface (GUI), a web browser, and an application-based interface, and an application programming interface (API).

* * * * *